Sept. 15, 1936.  W. S. NICHOLS  2,054,227

BALE TAG

Filed Feb. 26, 1934

W. S. NICHOLS. INVENTOR.

BY F. Lewis Peyton
ATTORNEY.

Patented Sept. 15, 1936

2,054,227

UNITED STATES PATENT OFFICE 2,054,227

BALE TAG

Wilson Shelby Nichols, Canton, Miss.

Application February 26, 1934, Serial No. 713,000

1 Claim. (Cl. 40—21)

This invention relates to identification tags and more particularly to identification tags employed on bales of goods or cotton.

Various devices of this character have previously been put on the market, but to date none of these devices have proven entirely satisfactory as permanent identification tags for bales of cotton or goods. It is very necessary that a permanent tag be attached to bales of goods or cotton, and especially cotton, as the handling of this product in bales has been subject to a great deal of fraud through imperfect tagging and through fire losses in the past.

One object of the invention is to provide an identification tag which is permanently attachable to cotton bales and non-removable therefrom as long as the bale is kept intact.

Still another object of the invention is to provide an identification tag which has a permanent identification mark thereon and which may not be removed from the article to which attached so long as that article is preserved in its normal packed state.

Another object of the device is to provide an identification tag of permanent nature which is simple in cost, easily handled and thoroughly adequate for its purpose.

Other objects and advantages of the invention will become apparent during the course of the following description:

Figure 3:
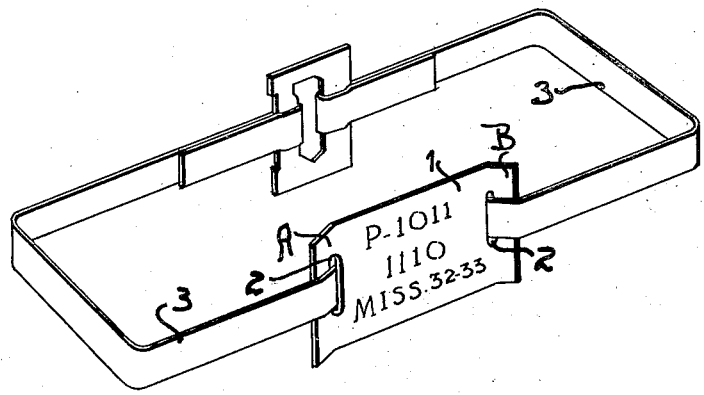
Figure 3 is a perspective view of the tag in attachment to a bale tie.

Following the drawing in detail the numeral 1, designates the surface of the tag which is flanged upwardly at either end A and B along the lines XX. The tag 1 is perforated in either end thereof, with openings 2—2 through which is adapted to pass the bale tie 3, as shown in Figure 3.

Figure 1:
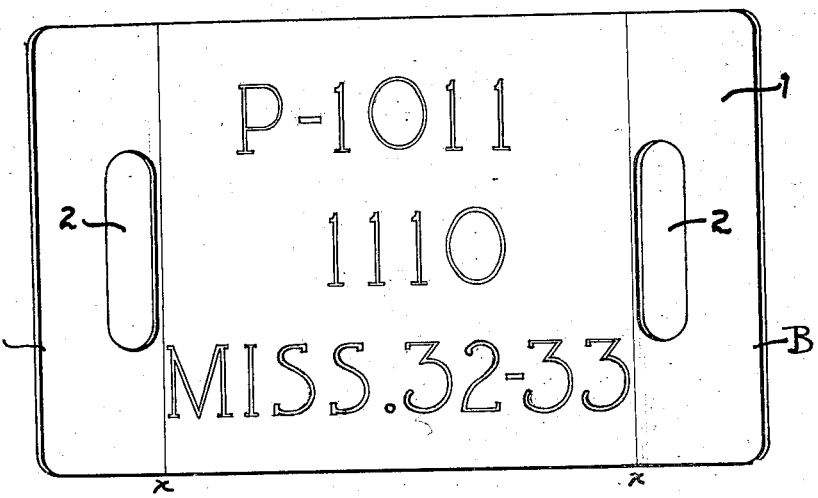
Figure 1 is a front plan of the tag.
Figure 2:
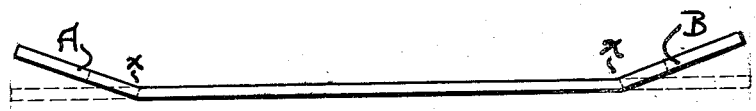
Figure 2 is a longitudinal view thereof.

The tag has impressed on the face thereof identification symbols similar to those shown in Figure 1. These symbols designate in the first line the gin number and the particular state in which the cotton was ginned and baled. The second line of symbols designate the particular bale ginned at this particular gin, designated by the first line of symbols. The bottom line of symbols designates the state in which the gin handling the bale of cotton is located and the year in which it was handled.

It is intended that each gin located within the state have designated symbols and that each gin keep a permanent record of each bale of cotton ginned, both for whom it was ginned and the grade of cotton shown to be ginned at that time. Thus it is seen that where ever the bale of cotton may be carried it is permanently identified and the grade of the bale and its original owner may always be traced.

The ties employed in baling cotton are permanent fixtures to the bale and, therefore, by passing the tie through slits in the tag, it is permanently attached to the bale and not subject to removal. The flanges A and B of the tag 1 have exerted on their outer surfaces the tension of the tie 3, and thus the tag 1 may not be slipped along the tie, but is permanently affixed to one definite location thereon with permanent relation to the bale on which the tie is affixed.

It is apparent, therefore, that I have devised an identification tag, expressly adapted for cotton bales which is of very great merit, and while I have shown and described and pointed out in the annexed claim certain features of my invention, it will be understood that various omissions, substitutions and changes in the form and details of the device illustrated and its means and use may be made by those skilled in the art, without departing from the spirit of the invention.

What I claim is:

In combination with a bale tie, an identification tag formed of a single oblong length of metal and having indicia stamped upon the face thereof, the respective ends of said tag turned upward and transverse slots disposed in each of the upturned ends, the baling tie passing over the turned up ends of the tag and through the slots under the face of the tag.

WILSON SHELBY NICHOLS.